(12) United States Patent
Mermoud et al.

(10) Patent No.: US 12,069,505 B2
(45) Date of Patent: Aug. 20, 2024

(54) APPLICATION-SPECIFIC HIGH FREQUENCY PASSIVE PROBING

(71) Applicant: Cisco Technology, Inc., San Jose, CA (US)

(72) Inventors: Grégory Mermoud, Venthône (CH); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/853,558

(22) Filed: Jun. 29, 2022

(65) Prior Publication Data
US 2024/0007366 A1    Jan. 4, 2024

(51) Int. Cl.
*H04W 28/02* (2009.01)
*H04L 9/40* (2022.01)
(Continued)

(52) U.S. Cl.
CPC ......... *H04W 28/0236* (2013.01); *H04L 41/16* (2013.01); *H04L 43/026* (2013.01);
(Continued)

(58) Field of Classification Search
CPC . H04W 28/0236; H04W 28/24; H04W 36/30; H04W 28/0967; H04W 36/06; H04B 17/336; H04B 17/15; H04B 17/17; H04L 63/1425; H04L 67/51; H04L 63/1408; H04L 67/535; H04L 67/30; H04L 67/306; H04L 51/18; H04L 63/0861; H04L 43/062; H04L 51/046; H04L 41/0654; H04L 43/04; H04L 63/1441; H04L 47/2441;
(Continued)

(56) References Cited

U.S. PATENT DOCUMENTS 10,944,641 B1    3/2021    Zacks et al.
10,958,555 B2    3/2021    Kumar et al.
(Continued)

OTHER PUBLICATIONS

"Enterprise Mobility 8.1 Design Guide", Nov. 16, 2020, 484 pages, Cisco Systems, Inc.
(Continued)

*Primary Examiner* — Kyung H Shin
(74) *Attorney, Agent, or Firm* — BEHMKE INNOVATION GROUP LLC; James M. Behmke; Keith O. Mitchell

(57) ABSTRACT

In one embodiment, a first networking device in a network coordinates, with a second networking device in the network, capture of packet maps for a traffic flow in the network associated with a particular application. The packet maps comprise multi-dimensional histograms indexed by identified properties of packets of the traffic flow and time. The first networking device inspects packets of the traffic flow, to identify properties of packets of the traffic flow. The first networking device generates a first packet map for the traffic flow based on the properties of the packets of the traffic flow identified by the first networking device. The first networking device causes a comparison between the first packet map and a second packet map generated by the second networking device to be used as a measure of application experience for the particular application.

20 Claims, 15 Drawing Sheets

(51) Int. Cl.
  *H04L 41/16* (2022.01)
  *H04L 43/026* (2022.01)
  *H04L 43/045* (2022.01)
  *H04L 47/2441* (2022.01)

(52) U.S. Cl.
  CPC ........ *H04L 43/045* (2013.01); *H04L 47/2441* (2013.01); *H04L 63/1425* (2013.01)

(58) Field of Classification Search
  CPC ......... H04L 45/38; H04L 47/33; H04L 47/35; H04L 47/11; H04L 47/12; H04L 47/31; H04L 47/283; H04L 47/56; G06Q 20/40145; G06Q 20/4016; G06Q 20/12
  See application file for complete search history.

(56) References Cited

U.S. PATENT DOCUMENTS

| | | | |
|---|---|---|---|
| 11,075,847 B1* | 7/2021 | Kwan | H04L 47/2441 |
| 11,316,772 B2 | 4/2022 | Lee et al. | |
| 2020/0014628 A1 | 1/2020 | Yang et al. | |
| 2022/0116415 A1* | 4/2022 | Burgis | H04L 63/1425 |
| 2022/0167236 A1* | 5/2022 | Melodia | H04W 28/0236 |

OTHER PUBLICATIONS

"Cisco Application Visibility and Control Field Definition Guide for Third-Party Customers", Nov. 30, 2017, 28 pages, Cisco Systems, Inc.

* cited by examiner ured by the first networking device. The first networking device causes a comparison between the first packet map and a second packet map generated by the second networking device to be used as a measure of application experience for the particular application.

APPLICATION-SPECIFIC HIGH FREQUENCY PASSIVE PROBING

TECHNICAL FIELD

The present disclosure relates generally to computer networks, and, more particularly, to application-specific high frequency passive probing.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques, in order to maximize the user experience for a given application. Beyond this, quantifying the application experience can also be used for purposes of network design, troubleshooting, and optimization.

However, quantifying application experience has become increasingly difficult, in recent years. Indeed, while it may be possible to rely on control signaling with Transmission Control Protocol (TCP) traffic to capture metrics regarding retransmissions and the client/server/network response time(s), many applications are moving away from using TCP for their traffic towards relying on User Datagram Protocol (UDP)-based approaches, instead.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1A:
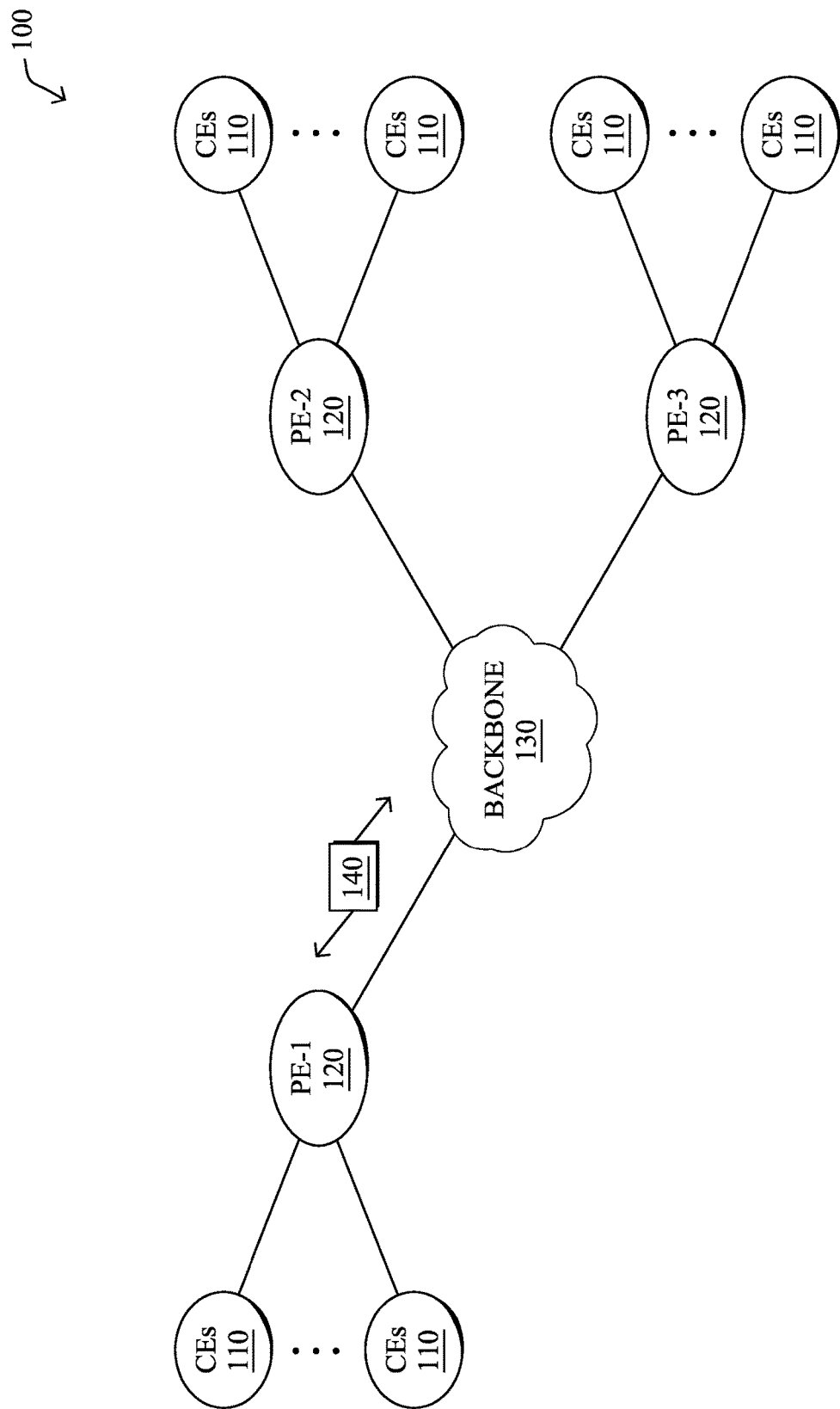
FIGS. 1A-1B illustrate an example communication network.

Overview According to one or more embodiments of the disclosure, a first networking device in a network coordinates, with a second networking device in the network, capture of packet maps for a traffic flow in the network associated with a particular application. The packet maps comprise multi-dimensional histograms indexed by identified properties of packets of the traffic flow and time. The first networking device inspects packets of the traffic flow, to identify properties of packets of the traffic flow. The first networking device generates a first packet map for the traffic flow based on the properties of the packets of the traffic flow identified by the first networking device. The first networking device causes a comparison between the first packet map and a second packet map generated by the second networking device to be used as a measure of application experience for the particular application.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
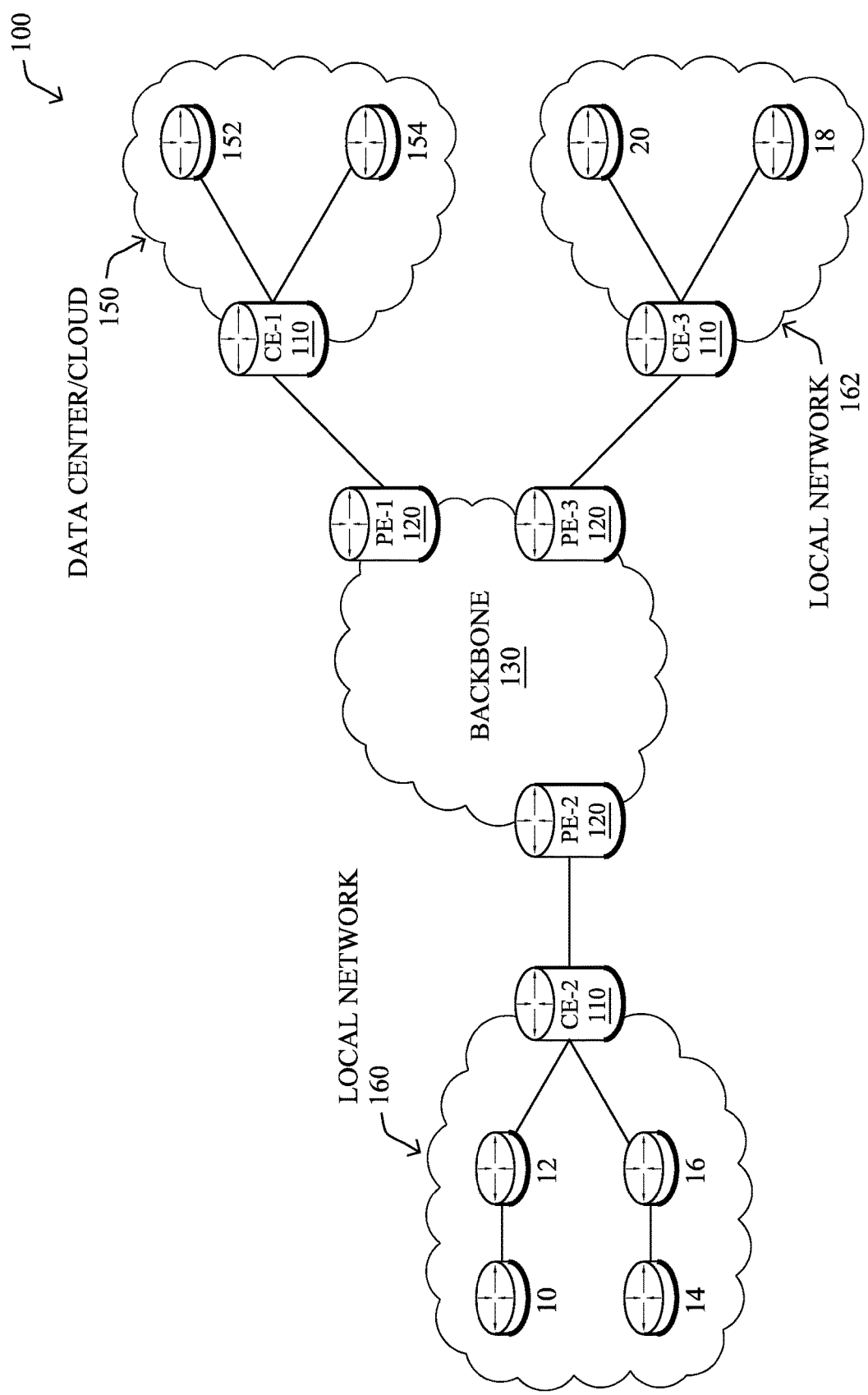

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
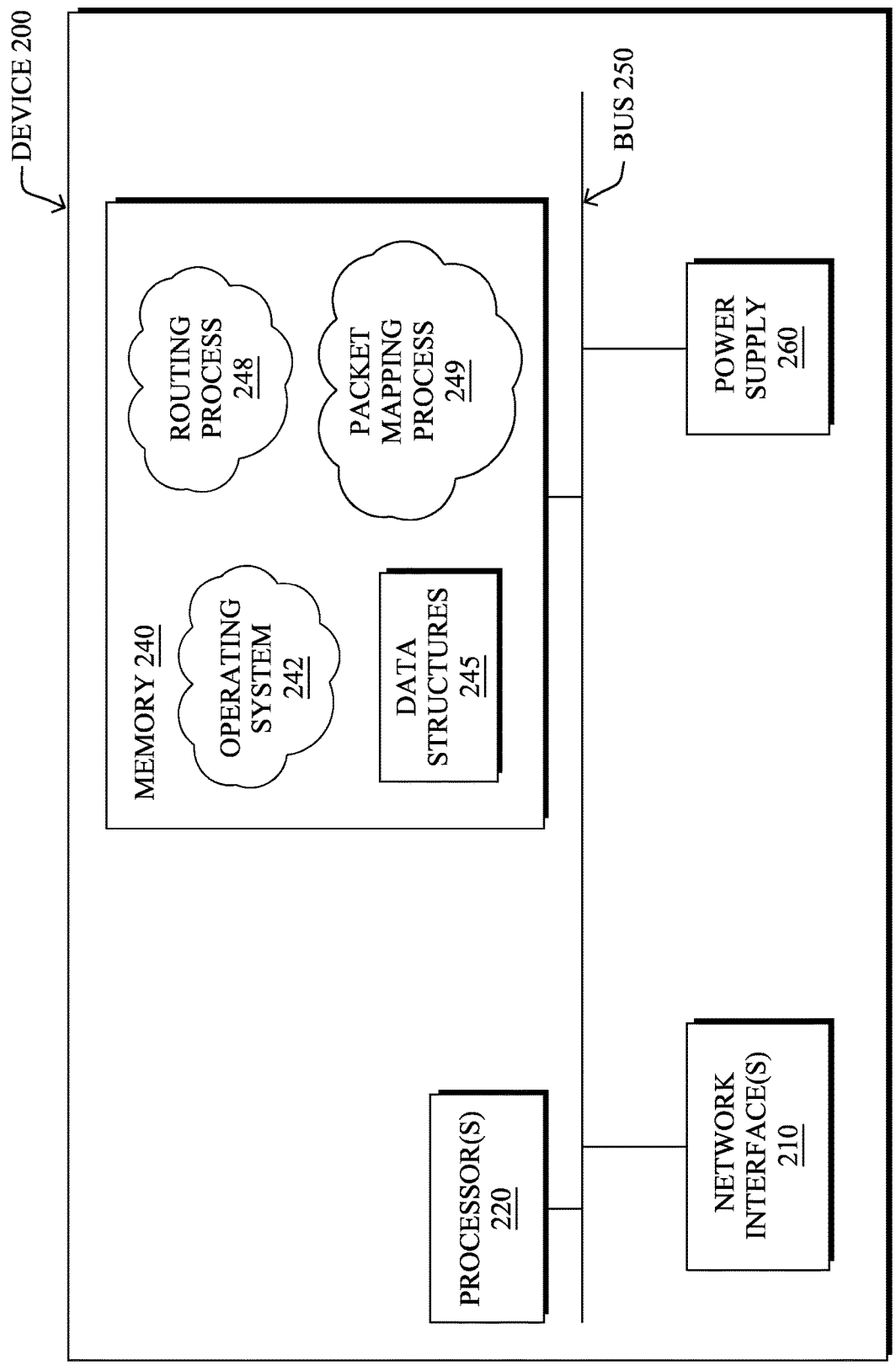
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 248 and/or a packet mapping process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 248 and/or packet mapping process 249 may include computer executable instructions that, when executed by processor(s) 220, cause device 200 to perform the techniques described herein. To do so, in some embodiments, routing process 248 and/or packet mapping process 249 may utilize artificial learning/machine learning. In general, artificial intelligence/machine learning is concerned with the design and the development of techniques that take as input empirical data (such as network statistics and performance indicators), and recognize complex patterns in these data. One very common pattern among these techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 248 and/or packet mapping process 249 may employ one or more supervised, unsupervised, or semi-supervised machine learning models. Generally, supervised learning entails the use of a training set of data, as noted above, that is used to train the model to apply labels to the input data. For example, the training data may include sample data that has been labeled as indicative of acceptable user experience or poor user experience. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 248 and/or packet mapping process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
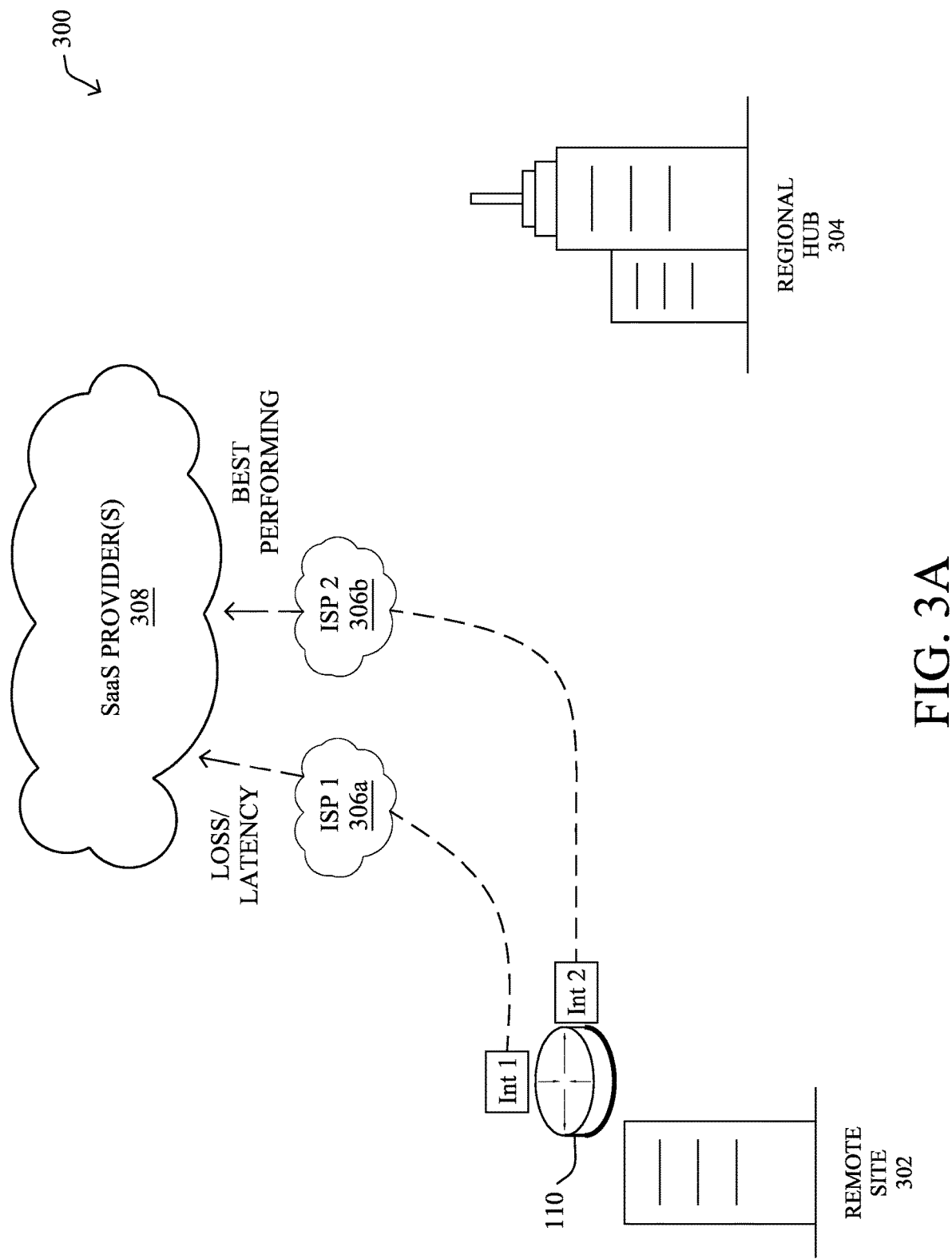
FIGS. 3A-3B illustrate example network deployments.
Figure 3B:
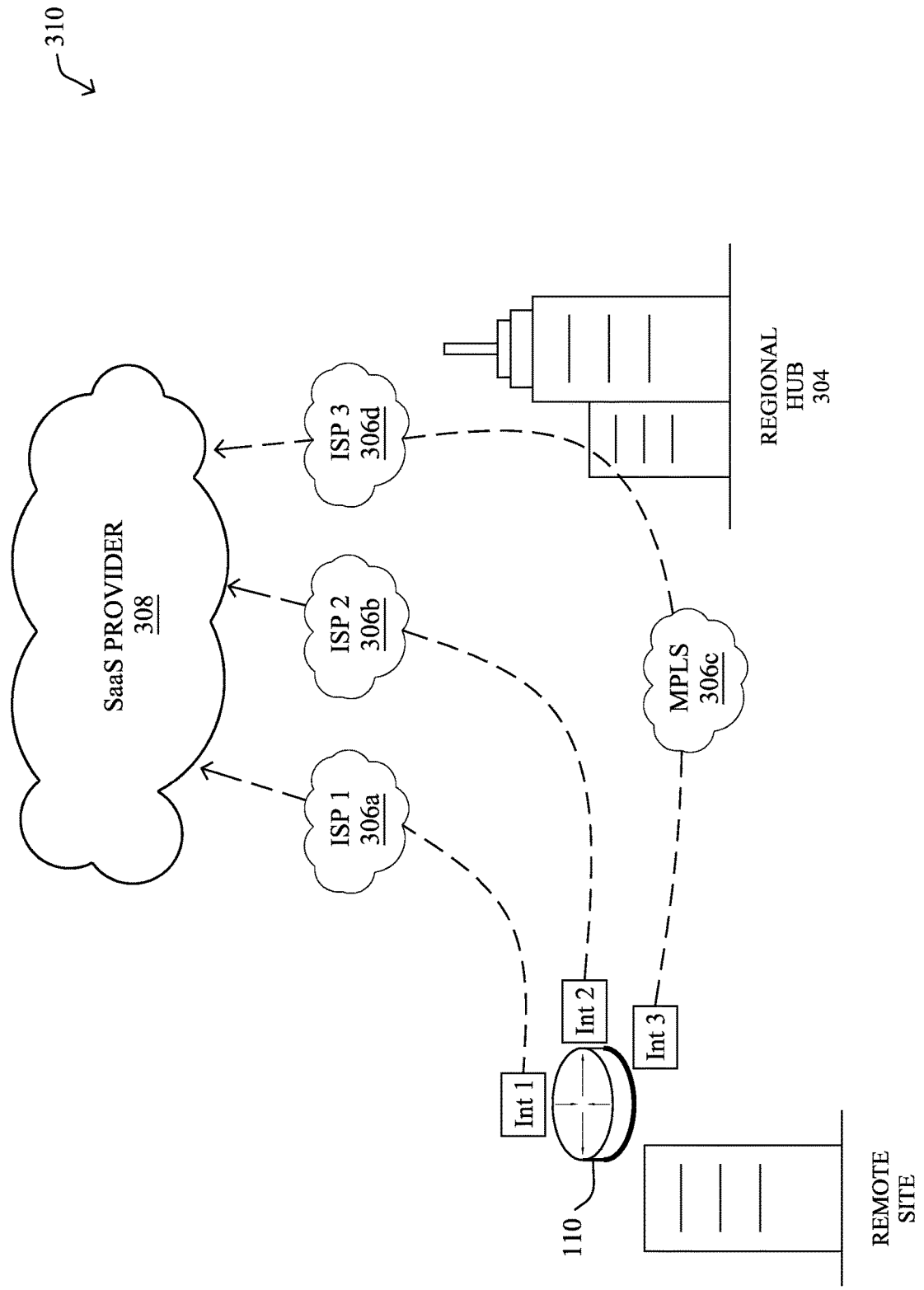

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
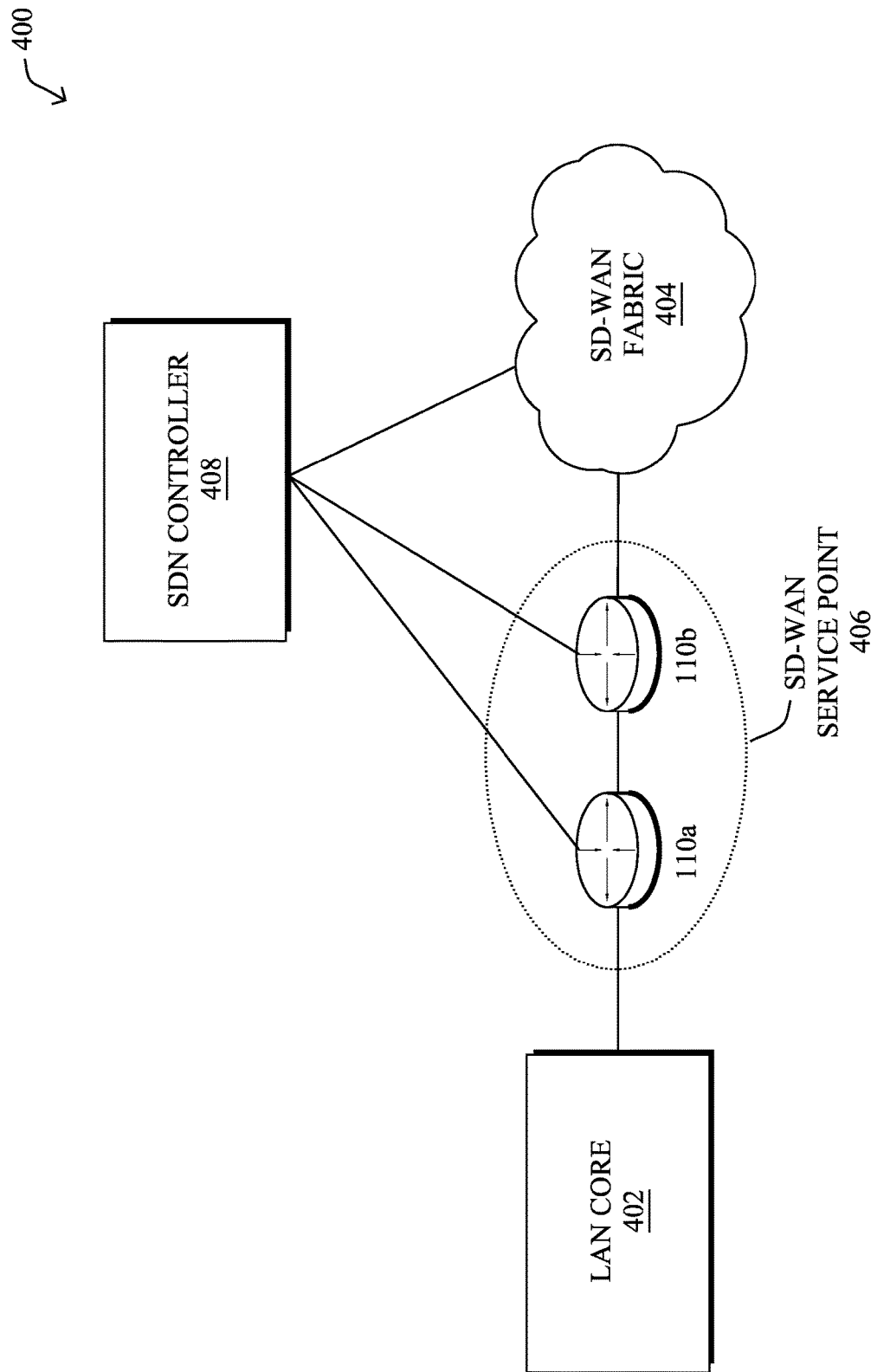
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

A primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application (i.e., the user experience).

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet. MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path.' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HypefText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
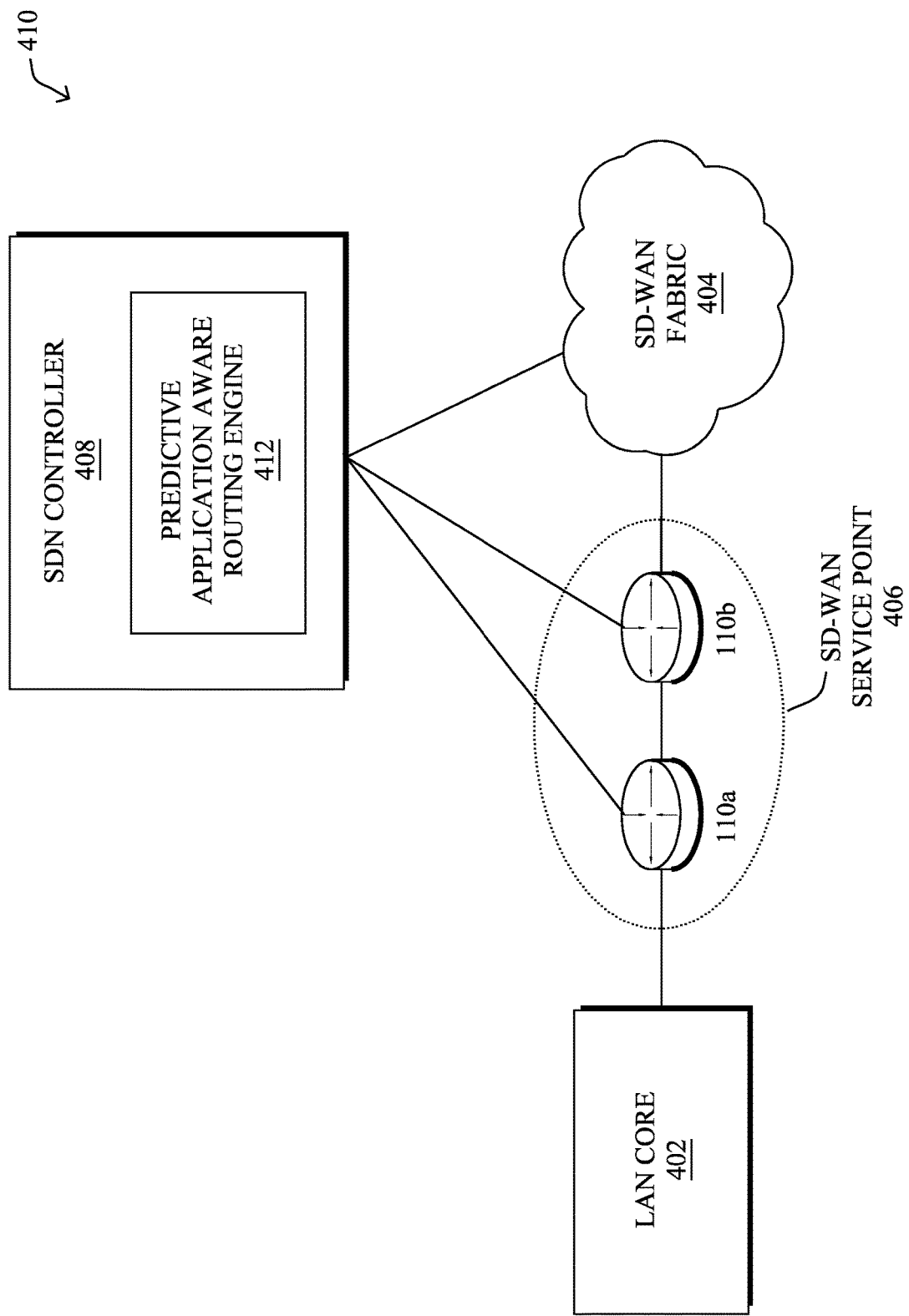

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As would be appreciated, modern SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:

Obtaining user feedback directly from the application

Applying traffic analytics, such as by analyzing Netflow records that include extra metrics like Application Response Time (ART)

Sending synthetic path probes to measure networking metrics to each SaaS application from each location. These probes are 'synthetic' in that they seek to mimic the actual characteristics of the traffic of the application under scrutiny.

Using hand-crafted heuristics based on domain expertise and other quantities (e.g., the concealment time)

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, the ability to probe application experience with high accuracy is crucial for purposes of network design, troubleshooting, and optimization (e.g., by selecting the optimal routing path for the application traffic, etc.). Technologies such as Application Response Time (ART) by Cisco Systems. Inc., rely on TCP control signaling to estimate the client, server, and network response times, as well as retransmission bytes and packets. However, it only applies to TCP traffic, which is slowly becoming scarcer as UDP-based protocols such as HTTP/3 and QUIC are increasingly being used by applications. This is even more prominent as newer protocols like QUIC use header protection that prevents the detection of retransmits, congestion window size changes, etc.

Application-Specific High Frequency Passive Probing

The techniques introduced herein allow for the passive inference of key network characteristics from the application traffic itself, even for fully encrypted applications. In some aspects, the techniques herein may be used to construct multi-dimensional histograms, referred to herein as "packet maps," from which classical network metrics such as loss, latency, and jitter can be derived, as well as richer indicators.

In further aspects, the packet maps may be computed dynamically by observing the application in use, such as at times that correspond to specific events. The richness of these high-dimensional probes also facilitates inferring application-level indicators using machine learning.

Illustratively, the techniques described herein may be performed by hardware, software, and/or firmware, such as in accordance with packet mapping process 249, which may include computer executable instructions executed by the processor 220 (or independent processor of interfaces 210) to perform functions relating to the techniques described herein, such as in conjunction with routing process 248.

Specifically, according to various embodiments, a first networking device in a network coordinates, with a second networking device in the network, capture of packet maps for a traffic flow in the network associated with a particular application. The packet maps comprise multi-dimensional histograms indexed by identified properties of packets of the traffic flow and time. The first networking device inspects packets of the traffic flow, to identify properties of packets of the traffic flow. The first networking device generates a first packet map for the traffic flow based on the properties of the packets of the traffic flow identified by the first networking device. The first networking device causes a comparison between the first packet map and a second packet map generated by the second networking device to be used as a measure of application experience for the particular application.

Operationally, in various embodiments, the techniques herein introduce a strategy to infer key network characteristics from any application traffic in a fully passive manner by creating so-called packet maps, which are multi-dimensional histograms indexed by time and packet properties (e.g., header, checksum, hash, etc.). Comparison of these histograms, e.g., computing their cross-correlation, can provide very rich information about the application experience, allowing for the inference of both basic network metrics such as latency, jitter, and loss, as well as new types of statistics that are akin to higher statistical moments such as the skewness or kurtosis of the latency, the distribution of the lost packets, etc. In various embodiments, these profiles can in turn be used to better assess the service delivered by the network to different applications.

Figure 5A:
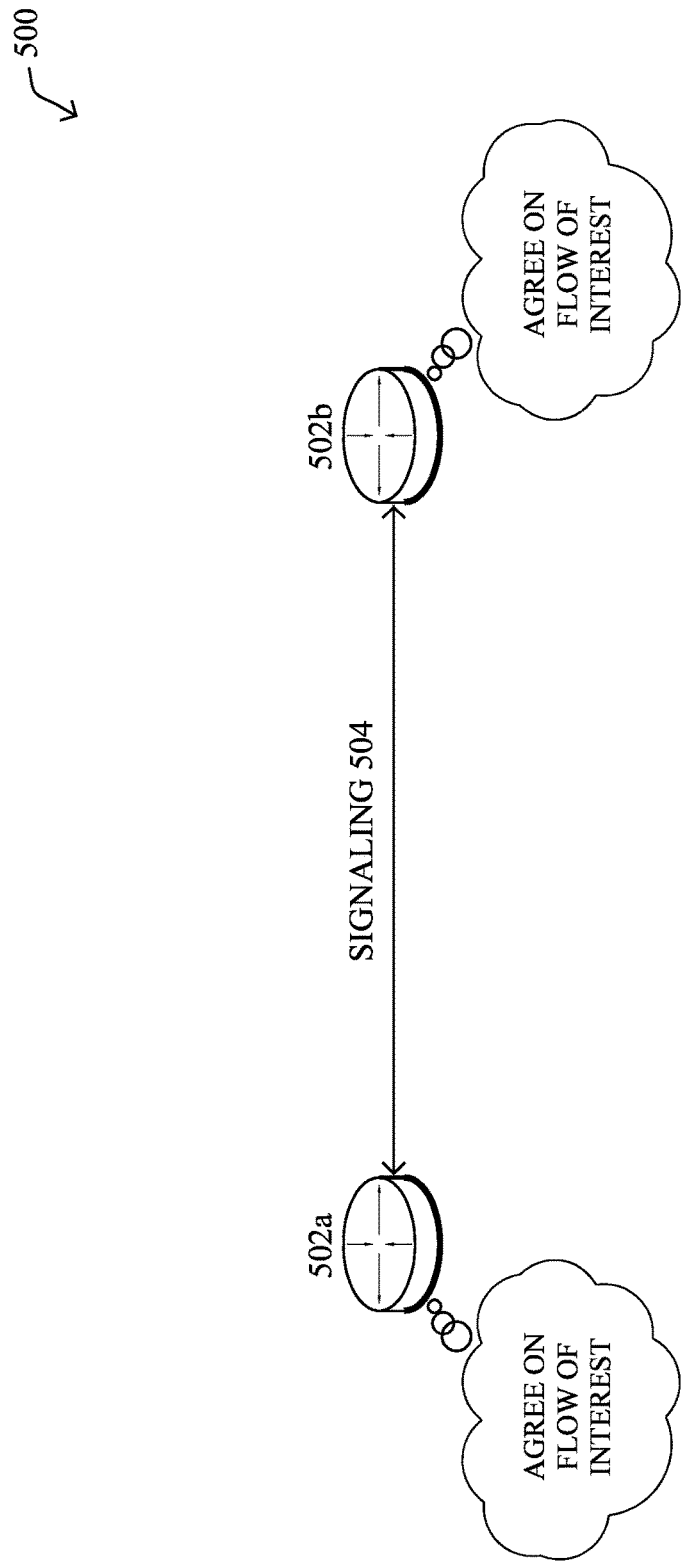
FIGS. 5A-5D illustrates an example of endpoints generating packet maps for a traffic flow.

FIGS. 5A-5D illustrates an example 500 of endpoints generating packet maps for a traffic flow, according to various embodiments. As shown in FIG. 5A, assume that there are a pair of networking devices 502a-502b along a network path (e.g., edge routers 110, etc.) via which traffic flows for a particular online application may flow. For instance, networking device 502a may send user traffic to a cloud-hosted application served by networking device 502b or vice-versa.

In various embodiments, networking devices 502a-502b may leverage a custom signaling protocol to exchange signaling 504 for purposes of identifying each other, agreeing on a traffic flow of interest, and coordinating the generation of packet maps for that traffic flow. For instance, as shown, networking devices 502a-502b may exchange signaling 504 to agree on the set of flow(s) to be monitored, the timing of the measurement(s) (e.g., a time interval [T0, T1]), the dimension(s) of the packet maps, and/or other such parameters for the passive probing. Any given flow of interest can be identified by its 5-tuple (e.g., source IP address, destination IP address, source port, destination port, and IP protocol in use). To ensure that the pair of networking devices 502a-502b are symmetric from a timing standpoint, they may also synchronize their clocks, such as by using the Network Time Protocol (NTP) or other suitable synchronization protocol.

In some embodiments, networking devices 502a-502b may opt to generate packet maps for a given traffic flow, in response to the occurrence of an event in the network. For example, network administrator may specify, via a user interface, one or more events that can trigger the start of the collection of packet maps. For example, the network administrator may decide to perform a measurement when the QoE for a given application starts to degrade, which can be detected, for instance, by monitoring the user experience using a public API (e.g., Webex, Zoom, etc. Additional rules may also be specified, so as to re-run the test once the MoS score reflecting the QoE has improved by x %. In turn, statistical analysis can then be used to correlate the measured experience with the packet maps. Of course, in further embodiments, the network administrator may also request capture of the packet maps for an application at scheduled times, on demand, etc., as well.

In further embodiments, the techniques herein may also rely on a mechanism to automatically detect the set of applications in use to mimic the user traffic. To that end, an application recognition engine such as Network Based Application Recognition (NBAR) by Cisco Systems, Inc., may be used and augmented with a local analysis of the flows (e.g., type of packets, coloring, inter-arrival times between packet for a given flow, etc.). The aim of this is to allow for the computation of packet map for application in use, instead of having to manually configure the types of packets. Here, packet coloring may mimic the policy used by the user traffic. Note that in addition to mimicking the user traffic, this mechanism may also learn the days and times in the day when such applications are in use, to perform measurements that would reflect the user traffic under similar conditions.

Figure 5B:
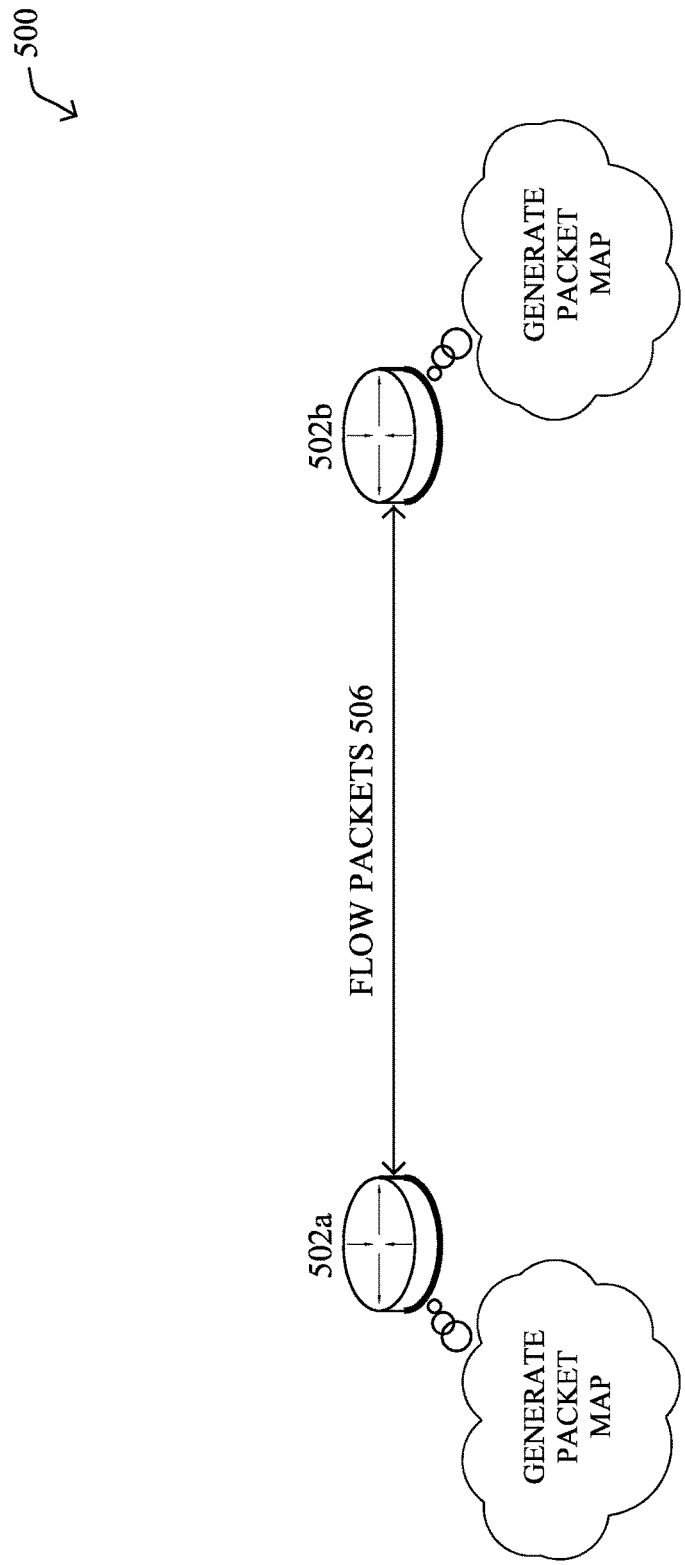

As shown in FIG. 5B, once networking devices 502a-502b have agreed on one or more traffic flow(s) of interest, they may each begin monitoring the flow packets 506 of those traffic flow(s). In some embodiments, this monitoring may entail each of networking devices 502a-502b performing deep packet inspection (DPI) on flow packets 506 during the agreed-upon time period. Typically, this measurement period is not envisioned to be longer than a few seconds, but could be longer, if so desired. In another embodiment, networking devices 502a-502b may agree to generate packet maps for more than one traffic flow at a time (e.g., by looking at all of the traffic of a given application regardless of the destination, etc.). In such a case, the only requirement is that the sets of traffic flows observed by both of networking devices 502a-502b are one and the same.

A measurement by consists in identifying the properties of the stream of packets for the traffic flow during the interval [T0, T1] in both directions (transmit and receive), such as the properties of flow packets 506. In turn, each of networking devices 502a-502b may generate its own packet map for the flow by using the packet properties to increment 'bins' that represent discrete ranges of values of the packet properties, in various embodiments. In other words, the packet maps may essentially take the form of multi-dimensional histograms, indexed by time bins in the interval [T0, T1] and the properties of the packet.

As would be appreciated, various packet properties of flow packets 506 may be identified by networking devices 502a-502b and used to generate their respective packet maps. For instance, such packet properties may include, but are not limited to, any or all of the following:

The packet type

The size of the packet (e.g., in bytes)

Specific bit values

Hash(es) of the packet(s) or portions thereof (e.g., their headers, payloads, etc.)

A packet map is typically application-specific and its exact dimensions may be crafted by domain experts and vary, depending on the application.

To illustrate the techniques herein a prototype packet map was generated for an (encrypted) QUIC traffic flow with the following dimensions:

Recorded time: 100 bins of 10 milliseconds (totaling a 1 second measurement interval)

Packet size: 40 bins of 35 bytes (totaling a range between 0 and 1,400 bytes, the maximal size of QUIC packets).

Packet hash: modulo-10 value of the SHA2 value of the payload, leading to 10 bins.

The total packet map 600 then amounts to 40,000 bins, each associated with a count of packets observed by the networking device having matching properties for that bin (e.g., the number packets in the flow having 0-35 bytes, etc.). Note that, by design, packet maps are often very sparse, allowing for high compression factors, as described in greater detail below.

Figure 6A:
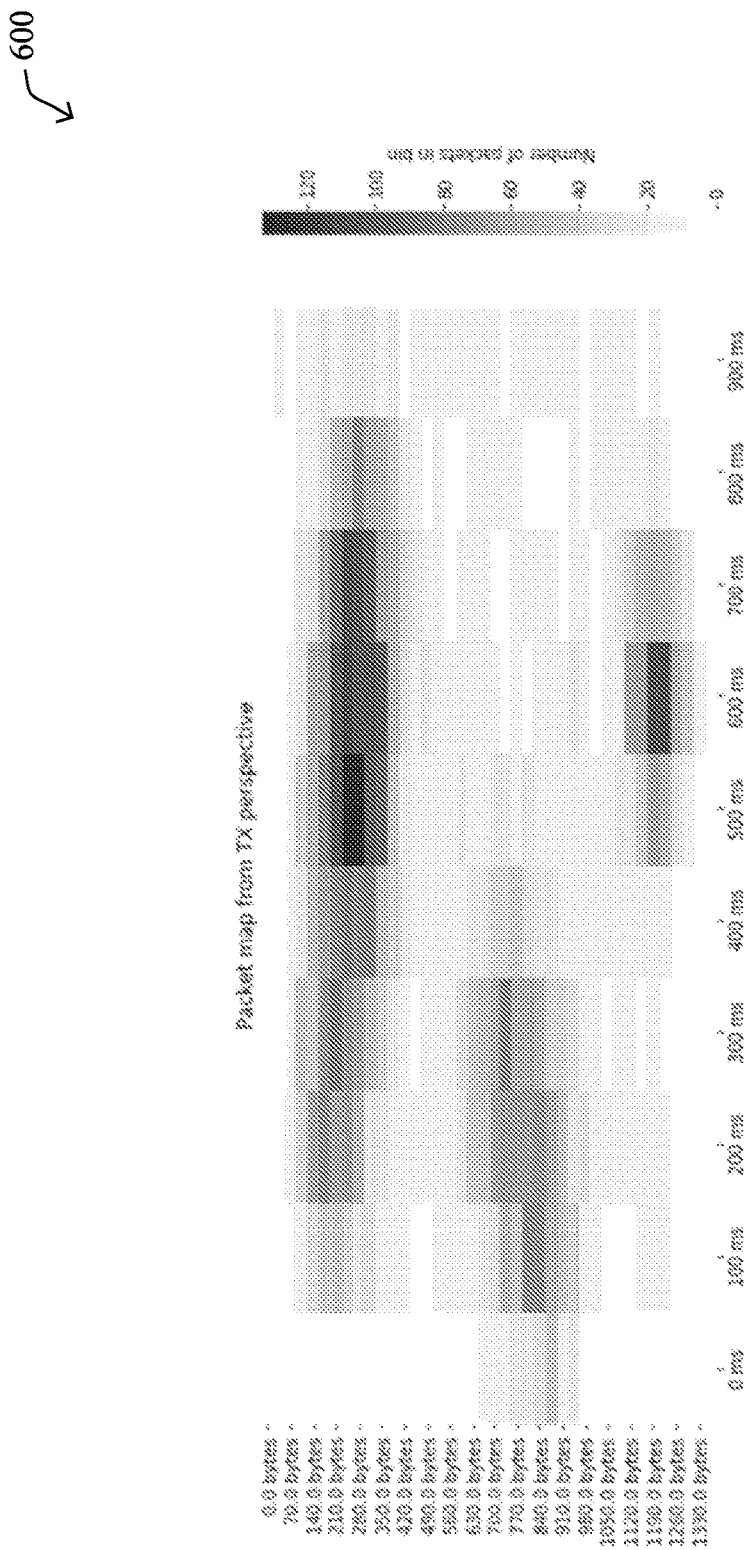
FIGS. 6A-6C illustrate example packet maps.
Figure 6B:
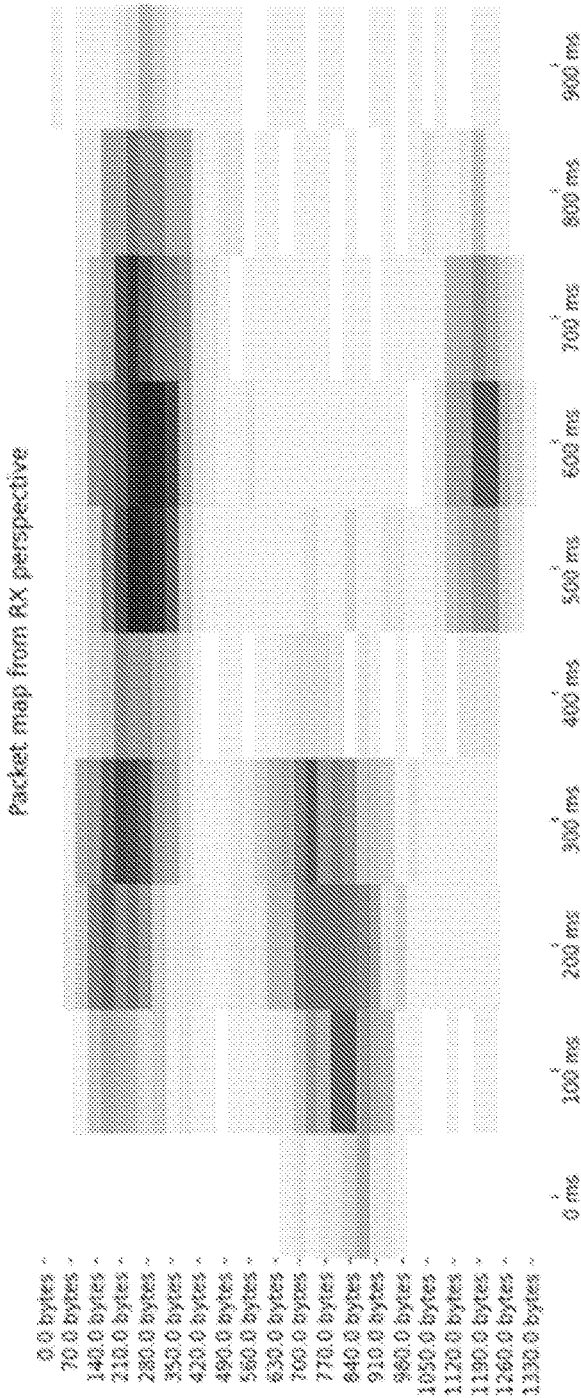

For illustrative purposes, FIG. 6A illustrates an example packet map 600 according to the above with only two dimensions shown: 1.) a time dimension with 100 bins of 10 milliseconds and 2.) a packet size dimension with 40 bins of 35 bytes, each. Here, packet map 600 was generated by the networking device that transmitted the packets of the traffic flow along the network path. FIG. 6B likewise shows the corresponding packet map for that same traffic flow, but as generated by the networking device that receives the packets of the flow.

Figure 5C:
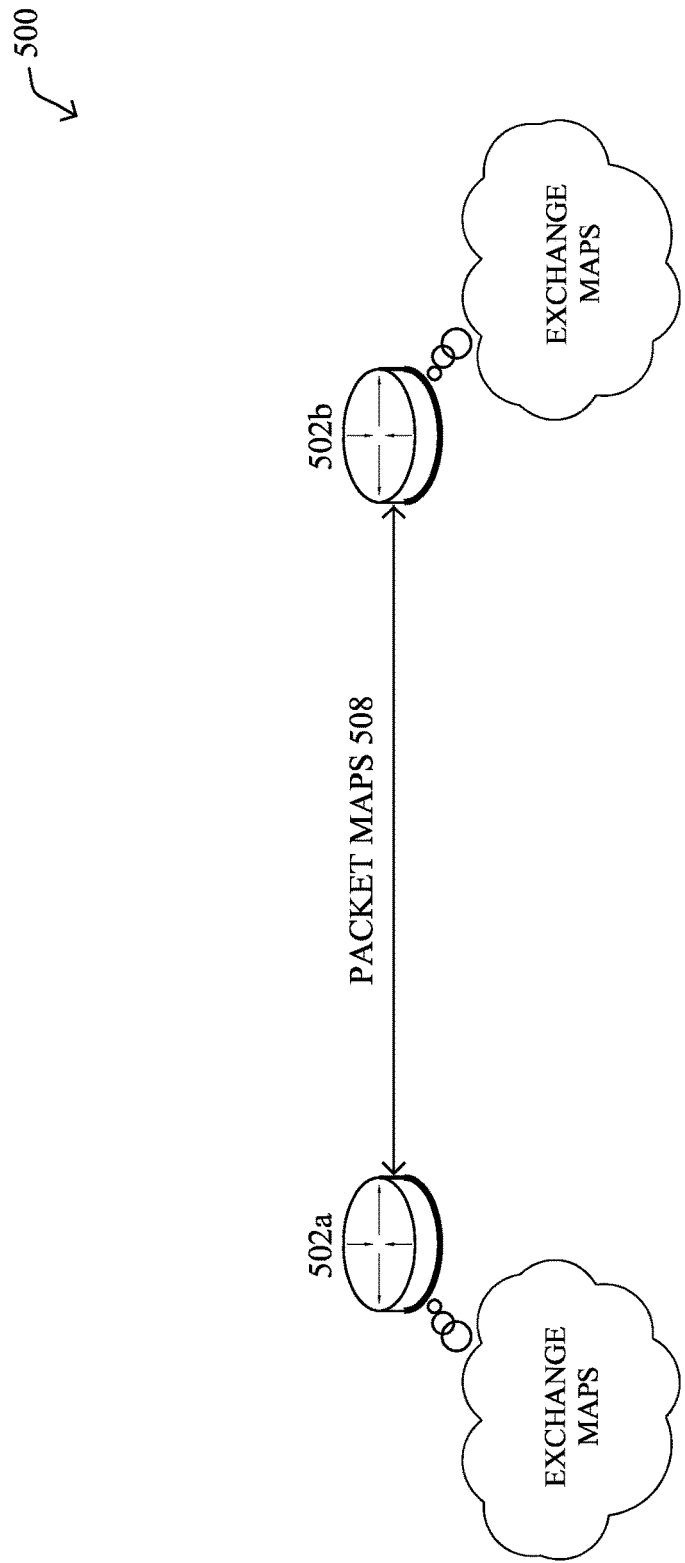
Figure 5D:
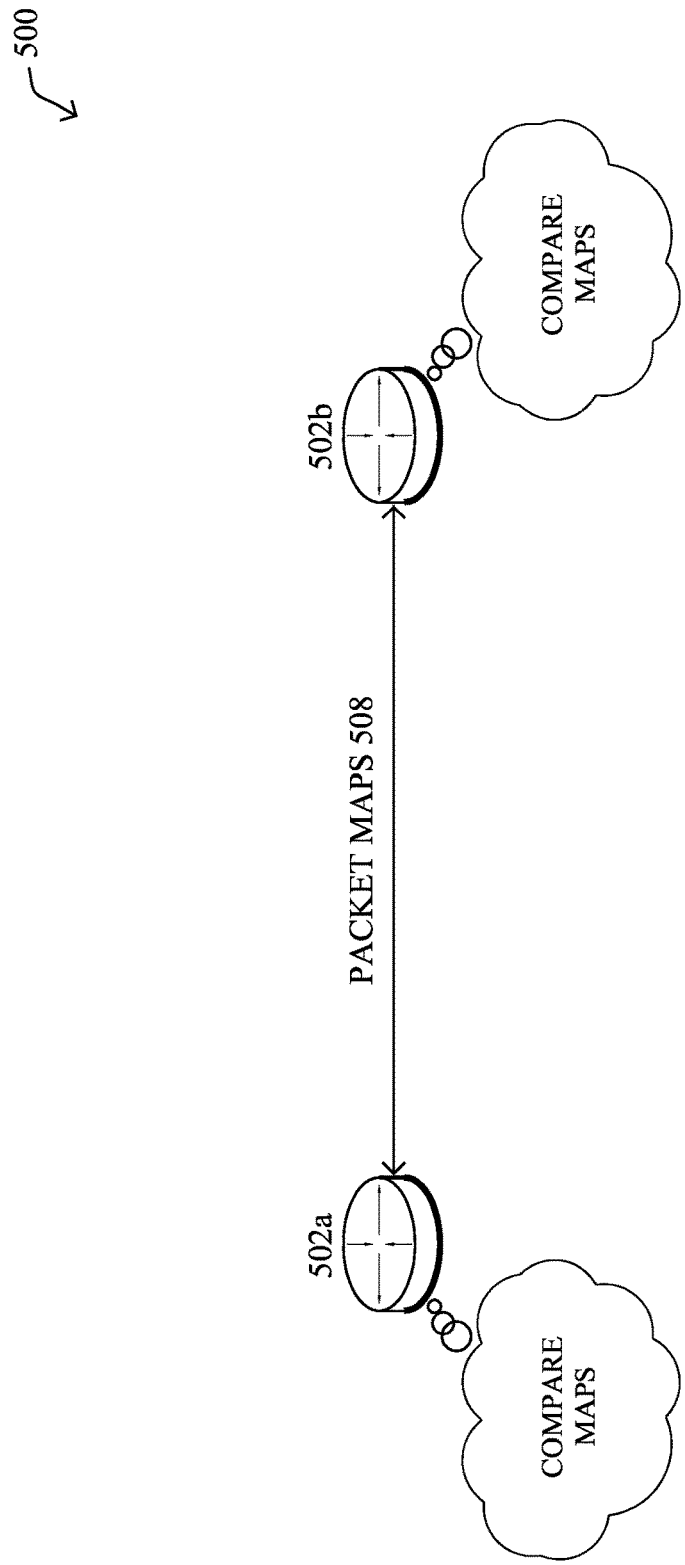

As shown in FIG. 5C, once networking devices 502a-502b have generated their respective packet maps 508 for the agreed-upon traffic flow, they may exchange their packet maps 508 with one another. In various embodiments, each of networking devices 502a-502b then aligns its own packet map 508 with that of the other networking device. More specifically, the measurements by networking devices 502a-502b are typically shifted in time by an interval that is approximately equal the average latency between networking devices 502a-502b. Thus, their respective packet maps 508 may be aligned with one another (e.g., temporally), so that they are roughly measuring the same window of traffic. Indeed, if Internet Control Message Protocol (ICMP) signaling is used to measure the latency, as opposed to the true latency of the traffic of interest, it may happen that packet map are not perfectly aligned, which is an important piece of information obtained from the probing mechanism.

According to various embodiments, various metrics of interest can be gleaned from a comparison between the aligned packet maps of networking devices 502a-502b, such as by evaluating the differences in their bin counts. For instance, networking device 502a may compare its packet map for its transmitted packets for a given flow to the packet map generated by networking device 502b for those packets received by device 502b.

One metric that can be identified by comparing the packet maps is the so-called 'blurring' effect due to the jitter. Further metrics of interest could also be related to second-order movement (e.g., skewness) whereby the blurring actually increases or decreases across the entire spectrum. Additional metrics that could be extracted from the comparison relate to whether some of the peaks are shifted in time differently as a function of the packet size (if the latter is one of the measured dimensions, of course). Similar strategies can be used to derive loss patterns, such as by obtaining information about the distribution of packet loss across time, packet size, etc., by comparing the packet counts on different portions of the packet maps.

Figure 6C:
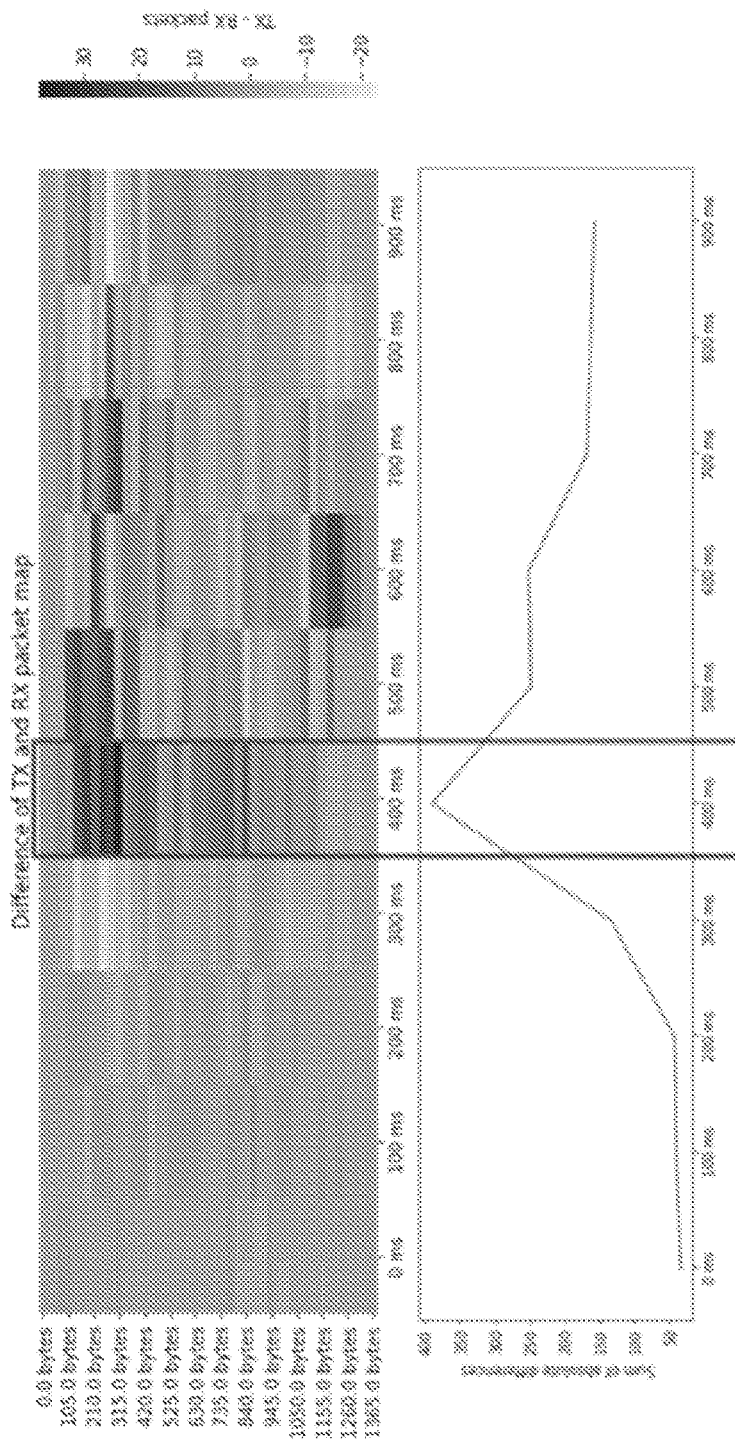

By way of example, FIG. 6C shows an example plot 620 of the difference between two respective packet maps. Here, a network test was conducted to simulate a realistic example of imperfect network transmission. More specifically, very short losses of connectivity (bursts of loss) were simulated. As would be appreciated, such bursts of loss are very difficult to handle for many protocols, and remain undetectable using classical methods of probing. However, as shown in FIG. 6C, the comparison of the packet maps clearly shows the loss event, despite lasting only 25 milliseconds. Furthermore, variations of jitter across a 1-second measurement is clearly visible as well in the time profile of cumulative absolute differences. Indeed, it can readily be seen that the jitter prior to the loss event is significantly lower than after it. In reality, the jitter is around 10 milliseconds prior to the event and 45 after it.

While the comparisons between packet maps have thus far been described with respect to the endpoint networking devices comparing their packet maps, further embodiments also provide for the comparison to be made by another device (e.g., a network controller, etc.). Regardless, once the comparison has been made, the metrics derived from the comparison can be used in a number of ways. In one embodiment, the packet maps themselves and/or information regarding their comparison may be provided to a user interface for review by an administrator or other user. In further embodiments, the packet maps (e.g., after alignment) and/or information obtained through their comparison may be used as input to a machine learning model. Such a model may be used to derive important properties of the network from the input data. For instance, a machine learning model may be trained from historical data where such measurements have been made on real networks and compared application-level metrics, such as concealment times of voice or video codecs, triggering of fast retransmit, retransmission timeout (RTO) in QUIC, etc. This allows for the detection of signs of application struggle, even for protocols with header protection such as QUIC, and could be used for purposes of making routing decisions or the like (e.g., as a component of predictive application aware routing engine 412).

Figure 7:
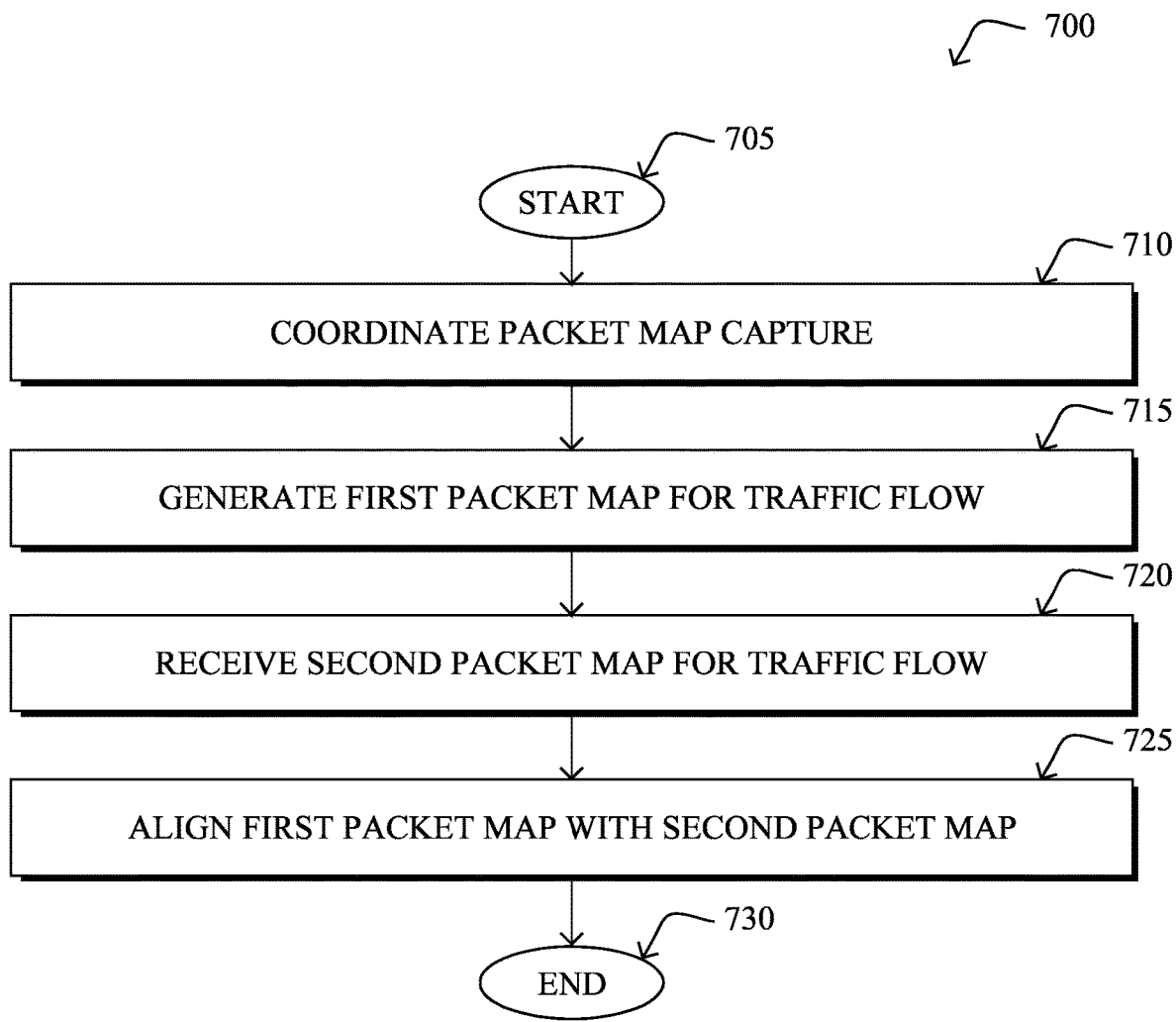
FIG. 7 illustrates an example simplified procedure for application-specific high frequency passive probing.

FIG. 7 illustrates an example simplified procedure 700 (e.g., a method) for application-specific high frequency passive probing, in accordance with one or more embodiments described herein. For example, a non-generic, specifically configured device (e.g., device 200), such as a first networking device (e.g., a router, etc.), or other device in communication therewith, may perform procedure 700 by executing stored instructions (e.g., packet mapping process 249). The procedure 700 may start at step 705, and continues to step 710, where, as described in greater detail above, the first networking device may coordinate, with a second networking device in the network, capture of packet maps for a traffic flow in the network associated with a particular application. In various embodiments, the packet maps comprise multi-dimensional histograms indexed by identified properties of packets of the traffic flow and time. In some embodiments, the second networking device is a network router. In various embodiments, the first networking device coordinates the capture of packet maps for the traffic flow with the second networking device in response to a command specified via a user interface. For instance, such a command may specify at least one of: a scheduled time to generate the packet maps or an event to trigger generation of the packet maps (e.g., when the MOS score for the application falls below a threshold, etc.).

At step 715, as detailed above, the first networking device may inspect packets of the traffic flow, to identify properties of packets of the traffic flow. In various embodiments, the properties of the packets of the traffic flow may comprise hashes of those packets (e.g., specific portions of the packets and/or their entirety), their packet types, their sizes, specific bit values, combinations thereof, or the like.

At step 720, the first networking device may generate a first packet map for the traffic flow based on the properties of the packets of the traffic flow identified by the first networking device, as described in greater detail above. In various embodiments, the first networking device may do so by using the information captured at step to increment counts in corresponding 'bins' in the first packet map.

At step 725, as detailed above, the first networking device may cause a comparison between the first packet map and a second packet map generated by the second networking device to be used as a measure of application experience for the particular application. In some embodiments, the first networking device may make the comparison directly. To do so, the first networking device may receive the second packet map from the second networking device and make the comparison between the first packet map and the second packet map. Of course, in other embodiments, the first networking device may instead rely on another device to make the comparison and send the first packet map to that device. In another embodiment, the first networking device may also send the first packet map to the second networking device, so that it can compare the two packet maps. In some embodiments, the first packet map is aligned with the second packet map, prior to the comparison being made between them. In another embodiment, the comparison is used as input to a machine learning model. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for application-specific high frequency passive probing, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   coordinating, by a first networking device in a network and with a second networking device in the network, capture of packet maps for a traffic flow of interest in the network associated with a particular application;
   wherein the first networking device and the second networking device exchange signaling to agree on identified properties of packets of the traffic flow of interest, wherein the packet maps comprise multi-dimensional histograms indexed by the identified properties of packets of the traffic flow of interest and time;
   inspecting, by the first networking device, packets of the traffic flow of interest, to identify properties of packets of the traffic flow of interest;
   generating, by the first networking device, a first packet map for the traffic flow of interest based on the properties of the packets of the traffic flow of interest identified by the first networking device; and
   causing, by the first networking device, a comparison between the first packet map and a second packet map generated by the second networking device to be used as a measure of application experience for the particular application.

2. The method as in claim 1, wherein the first networking device is a network router.

3. The method as in claim 2, wherein the second networking device is a network router.

4. The method as in claim 1, wherein the properties of packets of the traffic flow of interest comprise hashes of those packets.

5. The method as in claim 1, wherein causing the comparison between the first packet map and the second packet map to be used as a measure of application experience for the particular application comprises:
   receiving, at the first networking device, the second packet map from the second networking device; and
   making, by the first networking device, the comparison between the first packet map and the second packet map.

6. The method as in claim 1, further comprising:
   sending, by the first networking device, the first packet map to the second networking device.

7. The method as in claim 1, wherein the first packet map is aligned with the second packet map, prior to the comparison being made between them.

8. The method as in claim 1, wherein the comparison is used as input to a machine learning model.

9. The method as in claim 1, wherein the first networking device coordinates the capture of packet maps for the traffic flow of interest with the second networking device in response to a command specified via a user interface.

10. The method as in claim 9, wherein the command indicates at least one of: a scheduled time to generate the packet maps or an event to trigger generation of the packet maps.

11. An apparatus, comprising:
    one or more network interfaces to communicate with a network;

a processor coupled to the one or more network interfaces and configured to execute one or more processes; and a memory configured to store a process that is executable by the processor, the process when executed configured to:

coordinate, as a first networking device in the network and with a second networking device in the network, capture of packet maps for a traffic flow of interest in the network associated with a particular application;

wherein the first networking device and the second networking device in the network exchange signaling to agree on identified properties of packets of the traffic flow of interest, wherein the packet maps comprise multi-dimensional histograms indexed by the identified properties of packets of the traffic flow of interest and time;

inspect packets of the traffic flow of interest, to identify properties of packets of the traffic flow;

generate a first packet map for the traffic flow of interest based on the properties of the packets of the traffic flow of interest identified by the apparatus; and cause comparison between the first packet map and a second packet map generated by the second networking device to be used as a measure of application experience for the particular application.

12. The apparatus as in claim 11, wherein the apparatus is a network router.

13. The apparatus as in claim 12, wherein the second networking device is a network router.

14. The apparatus as in claim 11, wherein the properties of packets of the traffic flow of interest comprise hashes of those packets.

15. The apparatus as in claim 11, wherein the apparatus causes the comparison between the first packet map and the second packet map to be used as a measure of application experience for the particular application by:

receiving the second packet map from the second networking device; and making the comparison between the first packet map and the second packet map.

16. The apparatus as in claim 11, wherein the process when executed is further configured to:

send the first packet map to the second networking device.

17. The apparatus as in claim 11, wherein the first packet map is aligned with the second packet map, prior to the comparison being made between them.

18. The apparatus as in claim 11, wherein the comparison is used as input to a machine learning model.

19. The apparatus as in claim 11, wherein the apparatus coordinates the capture of packet maps for the traffic flow with the second networking device in response to a command specified via a user interface.

20. A tangible, non-transitory, computer-readable medium storing program instructions that cause a first networking device in a network to execute a process comprising:

coordinating, by the first networking device and with a second networking device in the network, capture of packet maps for a traffic flow of interest in the network associated with a particular application;

wherein the first networking device and the second networking device exchange signaling to agree on identified properties of packets of the traffic flow of interest, wherein the packet maps comprise multi-dimensional histograms indexed by the identified properties of packets of the traffic flow of interest and time;

inspecting, by the first networking device, packets of the traffic flow of interest, to identify properties of packets of the traffic flow of interest;

generating, by the first networking device, a first packet map for the traffic flow of interest based on the properties of the packets of the traffic flow of interest identified by the first networking device; and causing, by the first networking device, a comparison between the first packet map and a second packet map generated by the second networking device to be used as a measure of application experience for the particular application.

* * * * *

UNITED STATES PATENT AND TRADEMARK OFFICE
CERTIFICATE OF CORRECTION

PATENT NO. : 12,069,505 B2
APPLICATION NO. : 17/853558
DATED : August 20, 2024
INVENTOR(S) : Grégory Mermoud et al.

It is certified that error appears in the above-identified patent and that said Letters Patent is hereby corrected as shown below:

In the Specification

Column 7, Line 44 should read:
networking technologies (e.g., public Internet, MPLS (with Column 8, Line 45 should read:
Internet, MPLS, LTE transports providing highly varying Column 9, Line 10 should read:
QoE by sending HyperText Transfer Protocol (HTTP)

Column 10, Line 48 should read:
Cisco Systems, Inc., rely on TCP control signaling to Signed and Sealed this
Twenty-sixth Day of November, 2024

Katherine Kelly Vidal
*Director of the United States Patent and Trademark Office*